No. 613,596. Patented Nov. 1, 1898.
O. PATZSCHKE.
TOOL FOR CUTTING PIPE OR TUBING.
(Application filed Feb. 10, 1898.)
(No Model.)
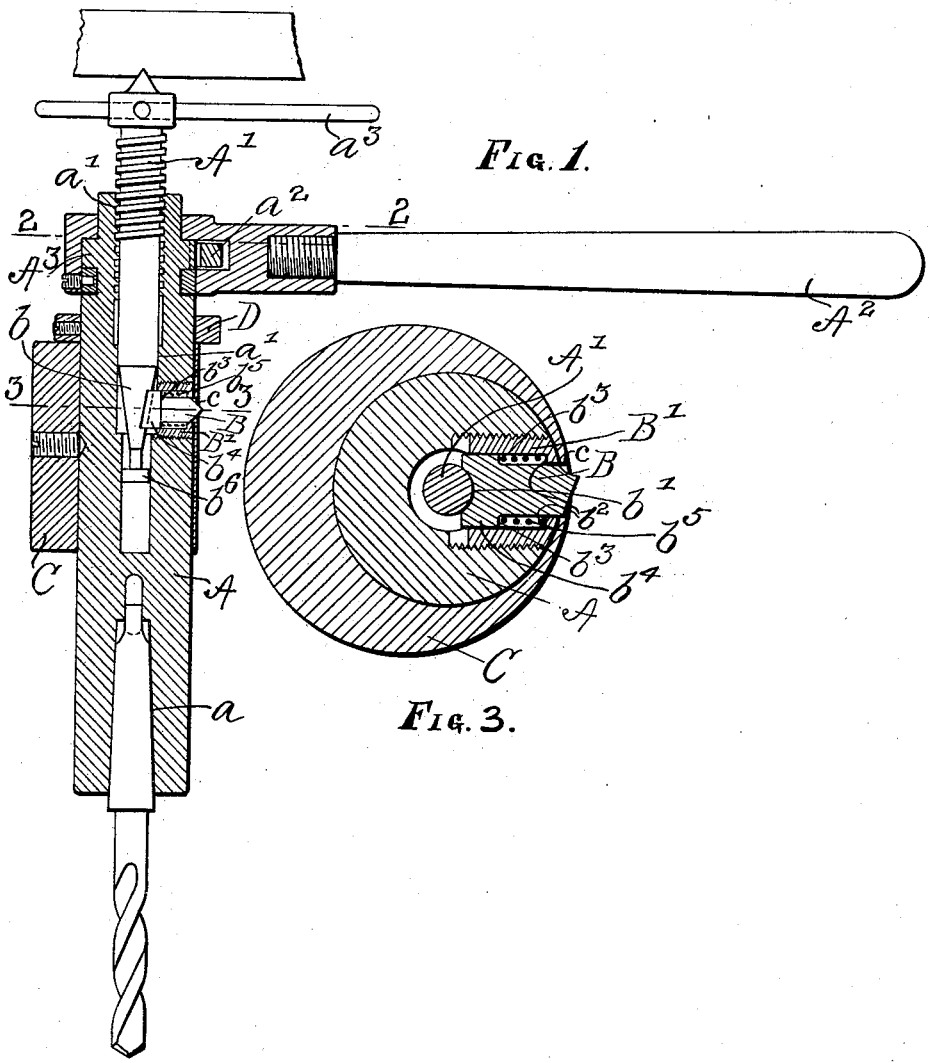

UNITED STATES PATENT OFFICE.

OTTO PATZSCHKE, OF VERONA, WISCONSIN.

TOOL FOR CUTTING PIPE OR TUBING.

SPECIFICATION forming part of Letters Patent No. 613,596, dated November 1, 1898.

Application filed February 10, 1898. Serial No. 669,757. (No model.)

*To all whom it may concern:*

Be it known that I, OTTO PATZSCHKE, a citizen of the United States, and a resident of Verona, in the county of Dane and State of Wisconsin, have invented a new and useful Pipe or Tube Cutter, of which the following is a specification.

This invention relates to pipe or tube cutters, and relates particularly to pipe or tube cutters adapted for cutting pipe or tubing from the inside.

A primary object of my invention is to provide an improved tool for this purpose adapted for cutting pipe or tubing of different sizes.

In the preferable form thereof now known to me a tool or mechanism for cutting pipe or tubing embodying my invention comprises a body portion, one end of which is tubular; a screw threaded to the tubular end thereof, which comprises a taper or conical section; a cutter fitted to a hole or bearing in the body portion of the tool, the inner end of which rests in contact with the taper on said screw; a groove or slot formed in the inner end of said cutter, which embraces said screw; a spring applied to said cutter adapted to maintain the same normally retracted; an eccentric bushing removably secured to the body of the tool, a hole or opening in which registers with the cutter-bearing; a ring or collar secured to the body portion of said tool, which is adjustable lengthwise thereof, and means to rotate the body of said tool.

A pipe or tube cutter embodying my invention also consists of the various other features, combinations of features, and details of construction hereinafter described and claimed.

In the accompanying drawings a pipe or tube cutter embodying my invention is fully illustrated, said tool being shown combined with a ratchet-drill.

Figure 1 is a longitudinal sectional view of my improved tool. Fig. 2 is a transverse sectional view thereof on the line 2 2 of Fig. 1, and Fig. 3 is an enlarged transverse sectional view thereof on the line 3 3 of Fig. 1.

Referring now to the drawings, A designates the body of my improved tool; $a$, a drill-socket formed in one end thereof; A', a feed-screw threaded to a hole $a'$, formed in the opposite end of the body portion A in alinement with the drill-socket $a$. $A^2$ is a hand-lever pivotally connected to said body portion A; $A^3$, a ratchet-wheel secured to said body portion; $a^2$, a pawl pivoted to the hand-lever $A^2$ and adapted to engage the teeth of the ratchet-wheel $A^3$, and $a^3$ a pin for manipulating the feed-screw A'.

All of the foregoing parts and elements are old and well known as embodied in ratchet-drills, and their construction and operation will be clearly understood from the drawings without a detailed description thereof.

Fitted to a transverse hole or bearing formed in the body portion A of the tool is a cutter B. The inner end of said cutter projects into the hole $a'$ and rests in contact with a tapered or conical portion $b$ of the feed-screw A', thus providing means to feed said cutter outwardly to expose the cutting-point thereof. Preferably, also, a groove $b'$ is formed in the inner end of said cutter, which embraces said feed-screw and operates to maintain said cutter in operative position.

As shown, the inner end of the cutter-bearing is enlarged, forming a shoulder $b^2$, between which and a shoulder $b^3$ on the cutter B, formed by a head $b^4$ thereon, which is fitted to said enlargement of the cutter-bearing, is a coiled spring $b^5$, which operates in an obvious manner to maintain said cutter normally retracted.

To provide for conveniently assembling my improved tool and removing the cutter B when desired, the bearing for said cutter is formed in a plug or bushing B', threaded into the body portion A of the tool.

To prevent the feed-screw A' from being unscrewed out of engagement with the cutter, in which case the cutter would be forced out of its seat or bearing by the spring $b^5$ and the tool rendered inoperative, a flange or collar $b^6$ is formed on said feed-screw, which will come into contact with the cutter as said feed-screw is screwed out, thus preventing further retraction thereof in the desired manner.

To adapt my improved tool for use in cutting pipes and tubes which are larger than the body A of said tool, a bushing C is removably secured to the exterior thereof, said bushing being loosely fitted to the interior of the pipe or tube to be cut, and by providing a number of such bushings of different sizes the tool is rendered available for cutting a corresponding number of different sizes of pipe or tube.

The bushings C are bored eccentrically and a hole or opening c is made in the thinnest portion thereof, said hole or opening being made sufficiently large to allow the passage therethrough of the cutter B and said bushing being secured to the body of the tool in such position that said hole or opening will register with the cutter seat or bearing.

A collar D, secured to the exterior of the body portion A of said tool and adjustable lengthwise thereof, affords convenient means for gaging the length of pipe to be cut off.

I claim—

1. In a tool or mechanism for cutting pipe or tubing, the combination of a body portion one end of which is tubular, a screw threaded to the tubular end thereof, said screw comprising a conical or tapered portion, a plug or bushing removably secured in the side of the body portion of said tool, a cutter fitted to a hole or bearing formed in said plug or bushing the inner end of which rests in contact with the tapered portion of said screw, a spring applied to said cutter and adapted to maintain said cutter normally retracted and means to rotate the body portion of said tool, substantially as described.

2. In a tool or mechanism for cutting flues or tubes, the combination of a body portion, a cutter mounted therein, a feed-screw, a spring applied to said cutter and adapted to maintain it, normally, retracted, an eccentric bushing removably secured to the body portion of said tool in such position that the thinnest portion of said bushing will be on that side of the body portion of said tool in which the cutter-bearing is formed, a hole or opening in said bushing which registers with said cutter-bearing and means to rotate the body of said cutter, substantially as described.

3. In a tool or mechanism for cutting pipe or tubing, the combination of a body portion one end of which is tubular, a screw threaded to the tubular end thereof, said screw comprising a conical or tapered section, a cutter fitted to a hole or bearing formed in the body portion of said tool the inner end of which rests in contact with the tapered portion of said screw, a spring applied to said cutter and adapted to maintain the same normally retracted, a bushing removably secured to the body portion of said tool and a hole or opening therein which registers with the cutter seat or bearing and means to rotate the body portion of said tool substantially as described.

4. In a tool or mechanism for cutting pipe or tubing, the combination of a body portion one end of which is tubular, a screw threaded to the tubular end thereof, said screw comprising a conical or tapered portion, a cutter fitted to a hole or bearing formed in the body portion of said tool the inner end of which rests in contact with the tapered portion of said screw, a spring applied to said cutter and adapted to maintain the same normally retracted, an eccentric bushing removably secured to the body portion of said tool in such position that the thinnest portion of said bushing will be on that side of the body portion of said tool in which the cutter-bearing is formed, a hole or opening in said bushing which registers with said cutter-bearing and means to rotate the body portion of said cutter, substantially as described.

5. In a tool or mechanism for cutting pipe or tubing, the combination of a body portion one end of which is tubular, a screw threaded to the tubular end thereof, said screw comprising a conical or tapered section, a cutter fitted to a hole or bearing formed in the body portion of said tool the inner end of which rests in contact with the tapered portion of said screw, a spring applied to said cutter and adapted to maintain the same normally retracted, a collar secured to the body portion of said tool so as to be adjustable lengthwise thereof and means to rotate the body portion of said tool, substantially as described.

6. In a tool or mechanism for cutting pipe or tubing, the combination of a body portion one end of which is tubular, a screw threaded to the tubular end thereof, said screw comprising a conical or tapered portion, a cutter fitted to a hole or bearing formed in the body portion of said tool the inner end of which rests in contact with the tapered portion of said screw, a spring applied to said cutter and adapted to maintain the same normally retracted, an eccentric bushing removably secured to the body of said tool in such position that the thinnest portion of said bushing will be on that side of the body portion of said tool in which the cutter seat or bearing is formed, a hole or opening in said bushing which registers with said cutter-bearing, a ring or collar secured to the body portion of said tool so as to be adjustable lengthwise thereof and means to rotate the body portion of said tool, substantially as described.

In testimony that I claim the foregoing as my invention I have hereunto set my hand this 31st day of January, 1898.

OTTO PATZSCHKE.

Witnesses:
W. L. MILLER,
A. C. HOPPMANN.